Patented Nov. 17, 1931

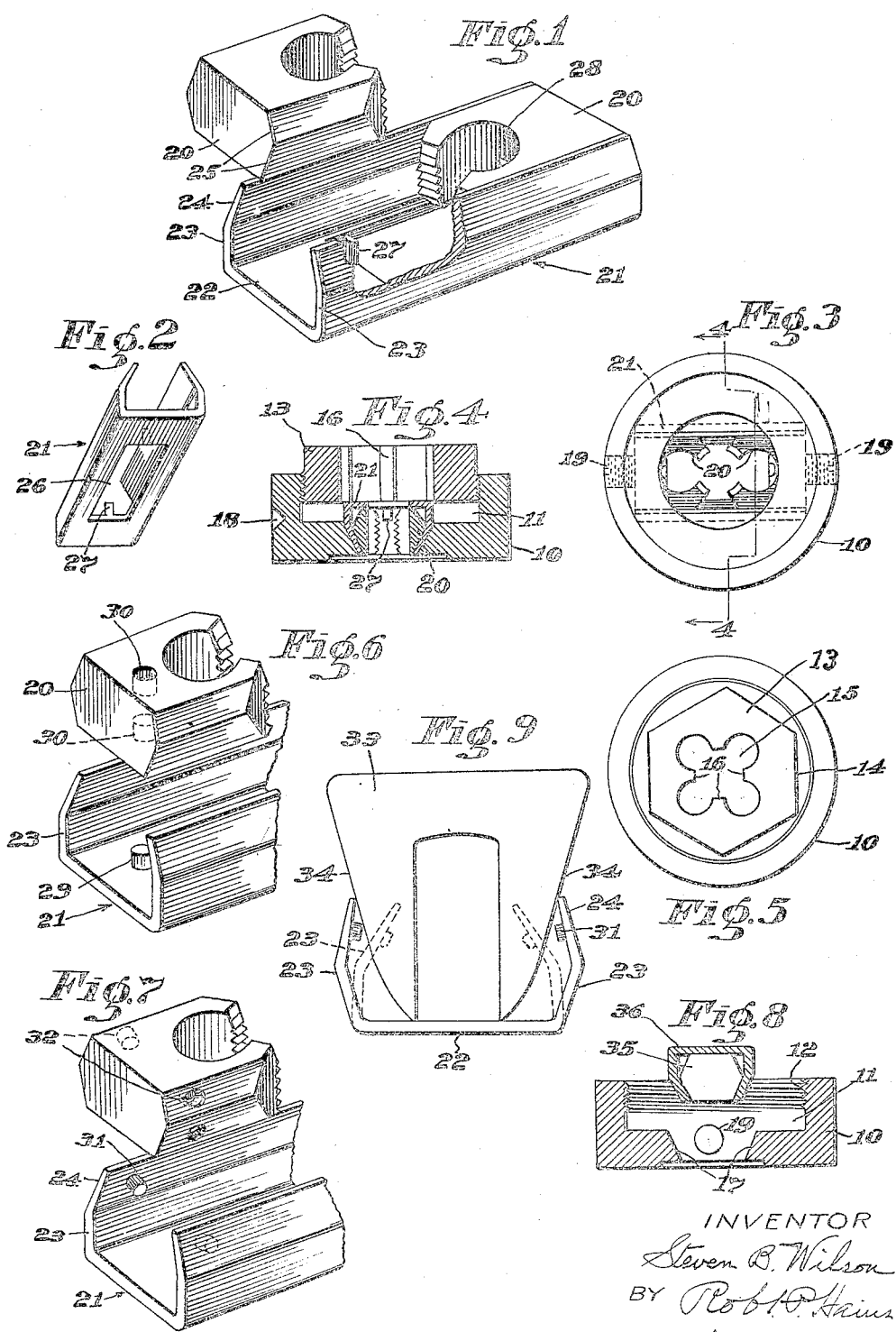

1,832,840

UNITED STATES PATENT OFFICE

STEVEN B. WILSON, OF NEWTON, MASSACHUSETTS

THREAD CUTTING DIE

Application filed November 21, 1930. Serial No. 497,231.

This invention relates to thread cutting dies of the type employing two or more separate die blanks or thread cutting elements.

There are two types of thread cutting dies in general use; namely the one piece or solid dies, and the multiple piece dies provided with two or more adjustable die blanks.

One piece or solid dies have been extensively used for many years but are open to the objection that they can be adjusted through only a very small range, if at all, and can not be sharpened when the cutting edges become dull so must be discarded.

The two piece or multiple piece dies have certain advantages over the solid dies, in that they can be adjusted through a relatively wide range to compensate for wear and depth of cut; can readily be removed from the collet and sharpened; and when worn out can be replaced by renewing only the small and inexpensive die blanks or thread cutting elements.

The two piece or multiple dies however, as constructed heretofore possess one serious defect in that they can not be quickly or easily adjusted by the average die user, to cut a thread of standard or other desired size. As a result much time and material have been wasted heretofore in adjusting these dies to size, by the slow unsatisfactory method of setting the die blanks (largely by guess work) and then cutting a thread to see whether or not it is of the desired size.

The present invention therefore contemplates a simple construction for holding and maintaining the die blanks in a desired position of adjustment either in or out of a collet so that the cooperating die blanks and holder may be placed in and removed from a collet without disturbing their relative adjustment.

One important feature of the present invention resides in a holder for the die blanks which is adapted to firmly hold the blanks in any desired adjusted relation to each other while they are either in or out of the collet. Through the employment of this novel holder it is practical to set the die blanks at the factory where they are manufactured so that they are properly spaced to cut a thread of standard depth when placed in a collet. It is also feasible to place the die blanks and their holder in a collet and remove them therefrom as often as desired without disturbing their adjustment relative to each other.

Another important feature of the present invention resides in stops employed in connection with the die blanks for arresting their relative movement, and as a result, the setting of the die blanks, so that they will occupy a definite known, thread cutting position relative to a standard thread, may be quickly secured by placing the die blanks in a holder so that they rest against the stops. As soon as this known adjustment of the die blanks is secured, it is a simple matter to position the blanks so that they will cut a standard or other size thread, since this is readily accomplished by positioning the die blank adjusting screws of the collet in abutting engagement with the blanks, and then rotating each screw through a small angle bearing a definite known relation to the pitch of threads of the screws and corresponding to the movement required to properly position the die blanks.

A further and more specific feature of the invention resides in a die blank holder having a bottom wall and resilient side walls or jaws adapted to firmly grip the die blanks to hold or clamp them in different position of adjustment, and in means for springing the jaws apart to facilitate the insertion of the die blanks in the holder and their removal therefrom.

Other features of the invention and novel combination of parts in addition to the above will be hereinafter described in connection with the accompanying drawings which illustrate good practical forms of the invention.

In the drawings:—

Fig. 1 is a perspective view of a die blank holder, constructed in accordance with the present invention, one of the die blanks being removed and the holder being partly broken away.

Fig. 2 on a reduced scale, is another perspective view of the holder, the die blanks being removed.

Fig. 3 is a bottom view of a die assembly or collet provided with the holder of the present invention.

Fig. 4 is a sectional view taken on the line 4—4 of Fig. 3.

Fig. 5 is a top view of the die assembly of Fig. 3.

Fig. 6 is a perspective view of a die blank holder, these parts being provided with a different type of stop from that shown in Figs. 1 to 4 inclusive.

Fig. 7 is a perspective view similar to Fig. 6 but discloses another arrangement of the stops for the die blanks.

Fig. 8 is a sectional view through the cap of Fig. 4 but shows a die blank holder associated therewith which is provided with thicker walls than the die blank holder of Fig. 4; and Fig. 9 is an end view of the die blank holder of Fig. 7 having a spreading wedge associated therewith.

The construction of the present invention is designed more particularly for use in connection with two piece dies, but the features of the present invention may be employed in dies provided with three or more die blanks.

The die blank holder or housing of the present invention may be employed with die assemblies of various constructions and has been illustrated in the drawings in connection with a die assembly or collet of well known construction.

The die assembly or collet illustrated comprises the usual annular or cup shape cap 10 which is formed with a relatively large central bore 11 and has the internal threads 12 adapted to cooperate with the external threads provided upon the guide 13. This guide is shown as having its side walls cut away adjacent its outer end to give the same the form of a hexagonal nut as indicated by 14 so that a wrench may readily be engaged with these flattened faces of the guide to screw the same into the cap 10 with sufficient force to exert a firm clamping action upon the die blanks to be described. The guide 13 is further provided with the usual work receiving opening 15 and with the projections 16 for guiding the die assembly lengthwise of the work during the thread cutting operation.

The cap 10 is further provided with the transversely extending recesses adapted to slidably receive the die blanks and these recesses have the usual beveled or inclined side walls 17. The annular cap 10 is adapted to be mounted in an annular recess formed in the usual stock (not shown) but employed to support and rotate the assembly or collet during the thread cutting operation and to this end the cap is provided with the usual bolt receiving recess 18 adapted to be engaged by a bolt carried by the stock to prevent the cap from rotating in the stock. The cap 10 is further provided with the usual die blank adjusting screws 19 positioned at the opposite ends of the elongated recesses 17.

The collet illustrated and comprising the cap 10 and guide 13 is adapted to receive a pair of die blanks or thread cutting elements 20 which may be of well known construction except these die blanks should be somewhat reduced in width as compared with the size of the die blank receiving recesses 17 so that these die blanks may be inserted in a holder or housing 21 which in turn is constructed to fit within the recesses 17 of the cap 10 as will be apparent from Fig. 4. The die blanks 20 illustrated have double bevels to permit them to be reversed in the collet.

The function of the holder or housing 21 is to firmly hold the die blanks 20 in any desired spaced relation to each other, and the construction is preferably such that the die blanks may be adjusted towards and from each other but will be firmly retained in the adjusted position by the holder. While the holder may be variously constructed it is illustrated in the drawings as provided with a base plate 22 having extending upwardly therefrom the spaced resilient side walls or jaws 23. These walls are disposed at approximately right angles to the base plate 22 but slope inwardly somewhat towards each other when not under tension, as shown in dotted lines in Fig. 9 so as to exert a continuous gripping action on the die blanks placed in the holder. The walls 23 slope inwardly at an increased angle near their outer ends as indicated at 24 to correspond to the angle of the beveled side walls 25 of the die blanks. The arrangement is such that the die blanks 20 may be placed in the holder 21 with either face of the die blanks in engagement with the wall 22 of the holder. This is desirable because die blanks usually have one cutting face tapered or relieved to a pronounced degree to facilitate the starting of the thread cutting operation when the die is first rotated relatively to the work, while the opposite face of the die blanks are only slightly relieved for fast but hard thread cutting action. It is important that the die blanks be reversably mounted in the holder 21 so that either the abrupt cutting threads or the gradually tapered cutting threads will face the work as desired, and this is accomplished by inserting the die blanks in the holder with the desired face of the blanks adjacent the base plate 22.

It is desirable that the holder 21 be always placed in the cap 10 so that the inner face of the guide 13 will engage the smooth outer face of the bottom wall 22 and not the edges of the walls 24 as this arrangement will prevent scoring between the inner end of the guide 13 and the wall 22. The placing of the holder in the cap with its wall 22 always towards the guide 13 is insured by forming the base of the holder 21 so that it is too wide to fit in the beveled recesses 17, as will be apparent from the drawings. The construction of the holder or housing 21 is such that its inclined walls 24 conform to the slope of the walls 17 as will be apparent from Fig. 4 to firmly hold the die blanks in place when the threaded guide 13 is tightened against the holder. This holder is further provided with a clearance opening 26 adapted to clear the work engaged by the die blanks and also to allow the chips to escape through this opening.

It will be seen from the foregoing that the construction of the holder 21 is such that the die blanks 20 when manufactured may be inserted in the holder 21 and properly positioned therein to cut a thread of standard size, so that when the unit shown in Fig. 1 and consisting of a holder and a pair of die blanks is sold to the trade this unit may be readily inserted in a collet for use to cut a thread of standard size without further adjusting the die blanks 20. Should it be desirable to cut a thread larger in diameter than the standard thread the die blank adjusting screws 19 obviously may be backed off slightly, whereas if it is desired to cut a thread smaller in diameter than the standard thread it is merely necessary to adjust the screws 19 inwardly slightly to shift the die blanks towards each other. The adjustment however should be made with the guide 13 relatively loose so as to permit movement of the blanks into abutment with the screws 19. It will therefore be seen that through the employment of the present invention much of the difficulty experienced heretofore in adjusting die blanks to cut a thread of a desired size is eliminated.

While the construction of the holder so far described will serve to maintain the die blanks in any desired position of adjustment, it may be desirable to provide additional means whereby after the die blanks have been shifted in the holder or removed therefrom they may again be readily placed in the holder in proper position to cut a thread of standard size. This feature of the present invention is accomplished by providing the holder 21 with stops adapted to limit the movement of the die blanks towards each other, or it may be away from each other so that when the die blanks abut against these stops they will cut a thread which is smaller than or larger than a standard thread by a predetermined and known amount. It will be seen from what has just been said that if when the die blanks are inserted in the holder against the stops they will cut a thread of known size, it is a simple matter to adjust the setting screws 19 either inward or outward to bring the die blanks 20 into position to cut a thread of standard size.

The stops just mentioned may be variously constructed and in Figs. 1 to 4 inclusive the holder 21 is shown as provided with the stops 27 extending upwardly from the lower wall 22 of the holder and positioned to engage the curved wall 28 of a die blank. The stops 27 will therefore limit the movement of the die blanks towards each other but will not limit the movement of the die blanks away from each other while in the holder. In Fig. 6 a modified construction is shown for limiting the movement of the die blanks both towards and from each other and this is accomplished by providing the lower plate 22 of the holder with an inwardly extending post 29 adapted to enter a slightly larger hole or recess 30 formed in the opposite faces of the die blank of Fig. 6. A further form of stops is shown in Fig. 7 of the drawings in which the opposite side walls 24 of the holder are shown as provided with the inwardly extending posts 31 adapted to enter holes or recesses 32 formed in the die blank of Fig. 7. In the construction shown in Figs. 6 and 7 there should be sufficient clearance between the stops and holes in which they are inserted to permit a slight adjustment of the die blanks towards and from each other so that these die blanks may be positioned to cut a thread either smaller or larger than a standard thread. If the construction is such that the workman employing the die knows how much the die blanks will cut undersize or oversize when abutting against the stops, and if he also knows the pitch of the screw threads upon the adjusting screws 19 it is a simple matter to rotate each of these screws through a small angle to thereby accurately position the die blanks so that they will cut a thread of standard size.

It will be seen that through the employment of the die blank holder of the present invention provided with stops for facilitating the positioning of the die blanks to cut a thread of known size with respect to a standard thread, it is a simple matter for the average workman to adjust the die blanks to cut a thread of standard size. This may be done by rotating the adjusting screws 19 through the proper angle and does not require the use of a thread gauge or other device for testing the size of the thread when cut.

In order to insert the die blanks in the holder it is necessary to spread the jaws 24 to receive the blanks therebetween, and in Figs. 6 and 7 the jaws must be spread sufficiently to permit engagement of the stops 29 or 30 with the cooperating holes in the die blanks. Various means may be employed to spring the side walls of the holder away from each other sufficiently to cause them to release or receive the die blanks, and one simple means to this end comprises the tapered wedge 33 having the inclined side walls 34 adapted to force the jaws 23 outwardly from the position in which they are shown in dotted lines of Fig. 9 to the position in which they are shown in full lines in this figure.

In some cases it may be desirable to use different size die blanks in the same cap and this may be accomplished in accordance with the present invention by mounting relatively small die blanks such as indicated by 35 in Fig. 8 in a holder 36 the walls of which are much thicker than those shown in the other figures of the drawings, and as a result the thick walls of the holder 36 will take up the clearance space between the side walls 17 of the cap and the side walls of the relatively small die blanks 35.

The die blank holder of the present invention in addition to its advantages above described serves also to facilitate the proper center of the die blanks within the collet, for since the die blanks are firmly held in spaced relation to each other by the holder 21 these parts may be adjusted transversely of the cap as a unit by backing off one set screw 19 and tightening up the other to thereby center the pair of die blanks with respect to the central axis of the collet.

In some forms of thread cutting dies the collet and stock are made integral, while in others the collet and stock are made detachable from each other, as shown by the illustrated embodiment of the invention, but in the broader aspect, the invention may be advantageously employed with either type of thread cutting dies, so that the term collet as employed in the specification and claims is to be construed in its broad sense to include both forms. Applicant believes himself to be the first in the art to provide a thread cutting die with separate thread cutting elements and a holder for the thread cutting elements insertable and removable from the collet with the cutting elements which maintains the thread cutting elements in their established thread cutting relation both in and out of the collet whether such collet is formed integral with or separate and detachable from the stock.

What is claimed is:

1. A thread cutting die comprising a collet, separate thread cutting elements, a holder for the thread cutting elements insertable in and removable from the collet and adapted to maintain the thread cutting elements in their established thread cutting relation either in or out of the collet.

2. A thread cutting die, comprising a collet adapted to be mounted in a stock, thread cutting elements, a holder for holding the thread cutting elements in different adjusted positions within the collet and constructed to maintain the thread cutting elements in their thread cutting relation to each other when the holder and thread cutting elements are removed from the collet.

3. A thread cutting die comprising a collet, separate thread cutting elements adapted to be adjustably mounted in the collet, a holder for the thread cutting elements insertable in and removable from the collet with the thread cutting elements and adapted to embrace the thread cutting elements and hold them in different positions of adjustment either in or out of the collet.

4. A thread cutting die comprising a collet, die blanks having beveled sides and adapted to be adjustably mounted in the collet, and a holder or housing for the die blanks insertable in and removable from the collet and constructed to embrace and firmly grip the bevel sides of the die blanks to maintain them in different positions of adjustment relative to each other both in or out of the collet.

5. In a two piece die, in combination, a collet comprising a cap and a guide, a pair of die blanks, and a holder for the die blanks insertable in and removable from the collet with the die blanks and constructed to embrace the die blanks and grip them with a strong spring action to maintain the die blanks in different positions of adjustment either in or out of the collet.

6. A thread cutting die comprising a collet having die blank receiving recesses provided with beveled side walls, die blanks having beveled side walls and adapted to be adjusted in the collet, and a holder for the die blanks insertable in the collet and having inclined sides adapted to fit the beveled side walls of the collet and constructed to firmly embrace the die blanks to maintain them in different positions of adjustment either in or out of the collet.

7. In a two piece die, in combination, a collet, a pair of die blanks, and a holder of spring sheet metal insertable in and removable from the collet and constructed to embrace the die blanks with a strong gripping action to maintain them in different positions of adjustment either in or out of the collet.

8. A thread cutting die comprising a collet, separate thread cutting elements relatively adjustable towards and from each other, a holder for the thread cutting elements insertable in and removable from the collet with the thread cutting elements and adapted to maintain the thread cutting elements in their established thread cutting relation either in or out of the collet, and means for limiting the relative adjustment of the thread cutting elements.

9. A thread cutting die comprising a collet, separate thread cutting elements adapted to be adjustably mounted in the collet, a holder for the thread cutting elements insertable in and removable from the collet with the thread cutting elements and adapted to embrace the thread cutting elements and hold them in different positions of adjustment either in or out of the collet, and stops upon the holder for limiting the adjustment of the thread cutting elements relative to each other.

10. In a two piece die, in combination, a collet, a pair of die blanks, a holder for the die blanks insertable in and removable from the collet and adapted to hold the die blanks in alignment with each other and to maintain the die blanks in different positions of adjustment either in or out of the collet, and stops upon the holder for limiting the relative adjustment of the die blanks.

11. In a two piece die, in combination, a pair of die blanks, a collet having a recess and adjusting screws for the die blanks, a holder for the die blanks insertable in said recess and constructed to maintain the die blanks in different positions of adjustment either in or out of the collet, and stops carried by the holder and adapted to limit the adjustment of the die blanks towards each other so that the die blanks under this adjustment will cut a thread of a known size different from the standard thread.

12. In a two piece die, in combination, a pair of die blanks, a collet, a holder for holding the die blanks in different positions of adjustment in and out of the collet, stops carried by the holder and positioned so that when the adjustment of the blanks relative to each other is arrested by the stops, the blanks will be positioned to cut a thread that differs a known predetermined amount from a standard thread, and set screws carried by the collet and having a known thread pitch so that the die blanks may be readily shifted a predetermined amount from the position in which they are arrested by the stops upon rotating the screws through the proper angle.

In testimony whereof, I have signed my name to this specification.

STEVEN B. WILSON.